(12) United States Patent
Wang et al.

(10) Patent No.: US 11,524,412 B2
(45) Date of Patent: Dec. 13, 2022

(54) INTELLIGENT CLEANING ROBOT

(71) Applicant: SUNGROW POWER SUPPLY CO., LTD., Anhui (CN)

(72) Inventors: Yaobang Wang, Anhui (CN); Jiapeng Zhu, Anhui (CN); Zhisheng Jin, Anhui (CN); Lichun Zhu, Anhui (CN); Wei Li, Anhui (CN)

(73) Assignee: Sunpure Technology Co., Ltd., Anhui (CN)

( * ) Notice: Subject to any disclaimer, the term of this patent is extended or adjusted under 35 U.S.C. 154(b) by 571 days.

(21) Appl. No.: 16/579,540

(22) Filed: Sep. 23, 2019

(65) Prior Publication Data
US 2020/0130196 A1 Apr. 30, 2020

(30) Foreign Application Priority Data

Oct. 29, 2018 (CN) .......................... 201811268054.0

(51) Int. Cl.
*B25J 11/00* (2006.01)
*H02S 40/10* (2014.01)
(Continued)

(52) U.S. Cl.
CPC ........... *B25J 11/0085* (2013.01); *B25J 5/007* (2013.01); *B25J 5/02* (2013.01); *H02S 40/10* (2014.12);
(Continued)

(58) Field of Classification Search
CPC ...... B21J 5/007; B21J 11/008; B21J 11/0085; A47L 11/24; A47L 2201/00; A47L 2201/06; H02S 40/10
See application file for complete search history.

(56) References Cited

U.S. PATENT DOCUMENTS 6,883,201 B2  4/2005  Jones et al.
2004/0049877 A1* 3/2004 Jones .................. A47L 5/30
                                                15/319
(Continued)

FOREIGN PATENT DOCUMENTS

CN  203468520 U    3/2014
CN  206630539 U   11/2017
CN  209120915 U  *  7/2019  ............... A01K 1/01

OTHER PUBLICATIONS

Indian Office Action regarding Application No. 201914040537 dated Apr. 5, 2021.

*Primary Examiner* — Jermie E Cozart
(74) *Attorney, Agent, or Firm* — Harness, Dickey & Pierce, P.L.C.

(57) ABSTRACT

An intelligent cleaning robot is provided by the present application, to clean dust on a surface of a photovoltaic cell assembly and lower a labor cost, and a walking posture of the intelligent cleaning robot may be adjusted according to needs. The intelligent cleaning robot includes a frame, a sweeping device installed on the frame to perform sweeping operations, a first walking wheel located at one end of the frame and driven by a first motor to move, a second walking wheel located at another end of the frame and driven by a second motor to move, and a control system in signal communication with both the first motor and the second motor and configured to control the first motor and the second motor to rotate synchronously, or control the first motor and the second motor to rotate in different rotational speeds or different directions.

19 Claims, 4 Drawing Sheets

(51) Int. Cl.
  *B25J 5/00* (2006.01)
  *B25J 5/02* (2006.01)
  *A47L 11/24* (2006.01)
(52) U.S. Cl.
  CPC ............ *A47L 11/24* (2013.01); *A47L 2201/00* (2013.01); *A47L 2201/06* (2013.01); *B25J 11/00* (2013.01)

(56) References Cited

U.S. PATENT DOCUMENTS

| | | | |
|---|---|---|---|
| 2004/0187249 A1* | 9/2004 | Jones | A47L 9/2852 15/319 |
| 2008/0209665 A1* | 9/2008 | Mangiardi | E04B 5/48 901/1 |
| 2011/0239382 A1* | 10/2011 | Lee | B60B 19/12 15/3 |
| 2012/0084934 A1* | 4/2012 | Li | A47L 11/33 15/319 |
| 2012/0181099 A1* | 7/2012 | Moon | A47L 9/009 901/1 |
| 2014/0130294 A1* | 5/2014 | Li | A47L 9/0488 15/372 |
| 2018/0199785 A1* | 7/2018 | Farmer | A47L 9/0472 |

* cited by examiner

INTELLIGENT CLEANING ROBOT

CROSS REFERENCE TO RELATED APPLICATION

The present application claims the benefit of priority to Chinese patent application No. 201811268054.0 titled "INTELLIGENT CLEANING ROBOT" and filed with the China National Intellectual Property Administration on Oct. 29, 2018, the entire disclosure of which is incorporated herein by reference.

FIELD

The present application relates to the technical field of solar photovoltaic power generation, and more particularly relates to an intelligent cleaning robot.

BACKGROUND

A photovoltaic cell assembly is a main component for photovoltaic power generation in the field of solar photovoltaic power generation, and is widely used in various kinds of photovoltaic power generation plants, and the service life of the photovoltaic cell assembly is generally about 25 years.

The photovoltaic cell assembly is operated outdoors for a long time. Dust in air deposits on the surface of the photovoltaic cell assembly gradually, which greatly decreases the efficiency of power generation of the photovoltaic cell assembly. The dust on the surface of the photovoltaic cell assembly may cause a financial loss of hundreds of millions of yuan per year in a photovoltaic power generation project. The financial loss directly reduces the investment income of the photovoltaic power generation plant, and will cause permanent impact.

In the conventional technology, the dust on the surface of the photovoltaic cell assembly is generally cleaned manually. Generally, a dusty surface of the assembly in the photovoltaic power generation plant is cleaned periodically to increase electric energy production. However, the cost of cleaning stays high with the increasing labor cost.

Therefore, an urgent technical problem to be solved by those skilled in the art is how to clean the surface of the photovoltaic cell assembly and reduce the labor cost.

SUMMARY

In view of this, an intelligent cleaning robot is provided according to the present application, which is configured to clean a surface of a photovoltaic cell assembly, to reduce a labor cost.

A technical solution according to the present application is provided as follows.

An intelligent cleaning robot includes:

a frame;

a sweeping device installed on the frame to perform a sweeping operation;

a first walking wheel located at one end of the frame and configured to be driven by a first motor to move;

a second walking wheel located at another end of the frame and configured to be driven by a second motor to move; and a control system in signal communication with both the first motor and the second motor, and configured to control the first motor and the second motor to rotate synchronously, or control the first motor and the second motor to rotate in different rotational speeds or different directions, to adjust a walking posture of the intelligent cleaning robot.

Preferably, the intelligent cleaning robot further includes:

a middle walking wheel installed on the frame between the first walking wheel and the second walking wheel; and/or a first limit wheel and a second limit wheel provided at two ends of the frame respectively, and the first limit wheel and the second limit wheel are configured to prevent scratching of sides of the intelligent cleaning robot, or to prevent the intelligent cleaning robot from deviating from its original walking course; and/or a protective shell covering the frame and the sweeping device.

Preferably, in the intelligent cleaning robot, the first walking wheel includes at least a pair of rollers, and/or the second walking wheel includes at least a pair of rollers.

Preferably, in the intelligent cleaning robot, the sweeping device includes a first sweeping device and a second sweeping device which are coaxially arranged;

an outer end of the first sweeping device is drivably connected to a third motor, and an inner end of the first sweeping device is rotationally connected to the frame; and an outer end of the second sweeping device is drivably connected to a fourth motor, and an inner end of the second sweeping device is rotationally connected to the frame.

Preferably, in the intelligent cleaning robot, the first motor and the third motor are the same motor, and/or, the second motor and the fourth motor are the same motor.

Preferably, in the intelligent cleaning robot, the frame includes a main frame, and a first box and a second box located at two ends of the main frame;

the first walking wheel and the first motor are installed on a mounting panel of the first box, and a first transmission system formed among the first walking wheel, the first motor and the sweeping device is enclosed in the first box; and the second walking wheel and the second motor are installed on a mounting panel of the second box, and a second transmission system formed among the second walking wheel, the second motor and the sweeping device is enclosed in the second box; and/or the control system is installed on the main frame.

Preferably, in the intelligent cleaning robot, the main frame is a rectangular frame structure, and the rectangular frame structure includes:

a first transverse beam and a second transverse beam located at two sides of the sweeping device respectively; and a longitudinal beam having two ends connected to the first transverse beam and the second transverse beam respectively.

Preferably, in the intelligent cleaning robot, the first transverse beam has an S-shaped cross section, and/or, the second transverse beam has an S-shaped cross section.

Preferably, in the intelligent cleaning robot, the two ends of the longitudinal beam includes a first end connected to the first transverse beam and a second end connected to the second transverse beam, and the first and second ends are each an L-shaped folded-plate connecting structure matching the shape of a bent portion of the S-shaped cross section.

Preferably, in the intelligent cleaning robot, the first transverse beam includes at least two transverse beam units connected end to end, and the second transverse beam includes at least two transverse beam units connected end to end; and the longitudinal beam includes a supporting longitudinal beam and a splicing longitudinal beam, the two transverse beam units connected end to end are connected through an end of the splicing longitudinal beam.

Preferably, an adjusting clearance is provided between the two transverse beam units connected end to end, and the adjusting clearance is greater than 0.

According to the above technical solutions, the intelligent cleaning robot provided by the present application is used to clean dust on the surface of the photovoltaic cell assembly. In the intelligent cleaning robot, the first walking wheel and the second walking wheel located at two sides are constrained by each other through the frame, which facilitates evenly applying force on the intelligent cleaning robot to allow the cleaning robot to operate smoothly. Further, the control system is driven by two motors (that is, a mode of dual-motor and dual-drive is used), and thus the control mode and adjust mode of the control system for driving and walking is more flexible and controllable. Thus, the first walking wheel and the second walking wheel may implement multiple modes of walking, for example, moving synchronously, moving independently, or moving with a certain speed ratio therebetween. In this way, the walking posture of the intelligent cleaning robot may be adjusted and corrected at will, which can meet detailed requirements of devices to be cleaned having various shapes and structures, and improve the capability of automatically avoiding obstacles and correcting deviations.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

Figure 1:
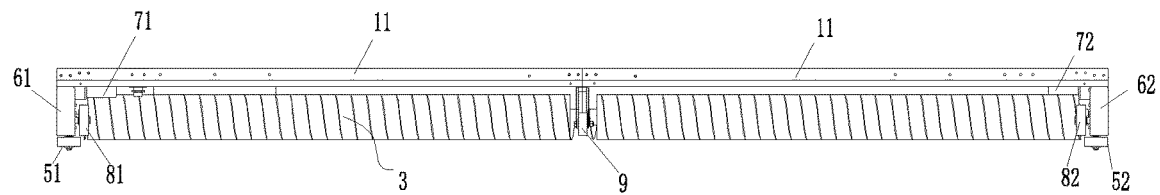
FIG. 1 is a front view showing an internal structure of an intelligent cleaning robot according to an embodiment of the present application.

| Reference Numerals: | |
|---|---|
| 11-transverse beam unit, | 21-supporting longitudinal beam, |
| 22-splicing longitudinal beam, | 3-sweeping device, |
| 4-control system, | 51-first limit wheel, |
| 52-second limit wheel, | 61-first box, |

| Reference Numerals: | |
|---|---|
| 62-second box, | 71-first motor, |
| 72-second motor, | 81-first walking wheel, |
| 82-second walking wheel, | 30-sweeping chain wheel, |
| 70-motor chain wheel, | 80-walking chain wheel, |
| 9-middle walking wheel. | |

DETAILED DESCRIPTION

An intelligent cleaning robot is provided according to the present application, to sweep dust on a surface of a photovoltaic cell assembly, to reduce labor cost.

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

Figure 2:
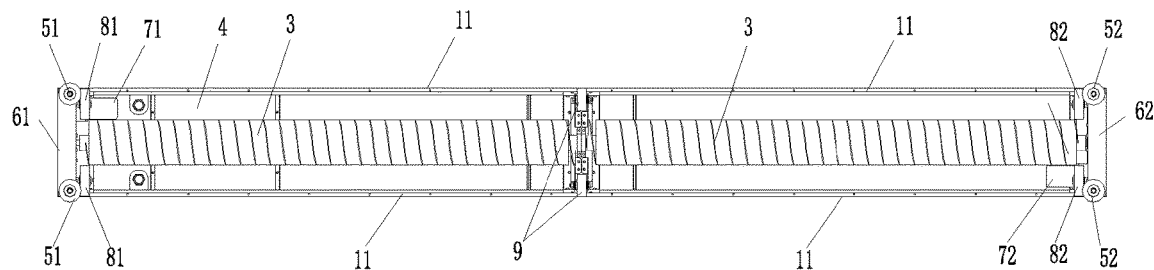
FIG. 2 is a bottom view showing the internal structure of the intelligent cleaning robot according to an embodiment of the present application.
Figure 3:
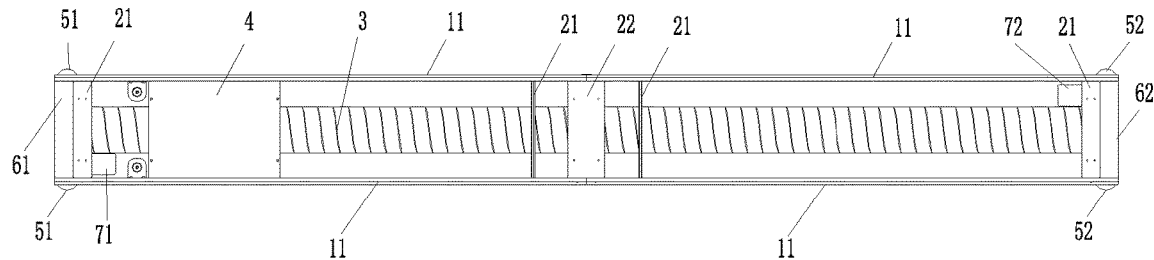
FIG. 3 is a top view showing the internal structure of the intelligent cleaning robot according to an embodiment of the present application.
Figure 4:
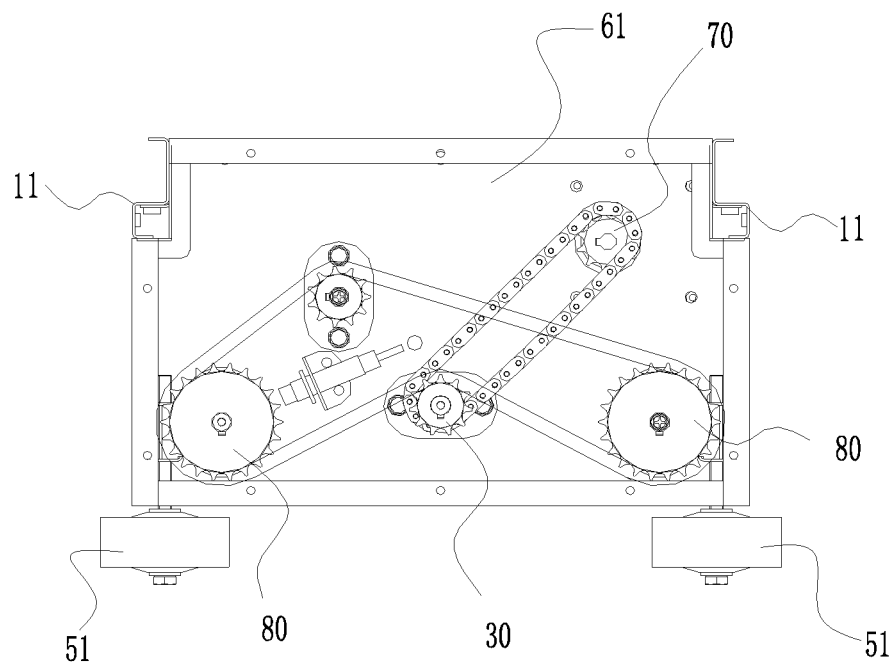
FIG. 4 is a schematic view showing the structure of a first transmission system according to an embodiment of the present application.
Figure 5:
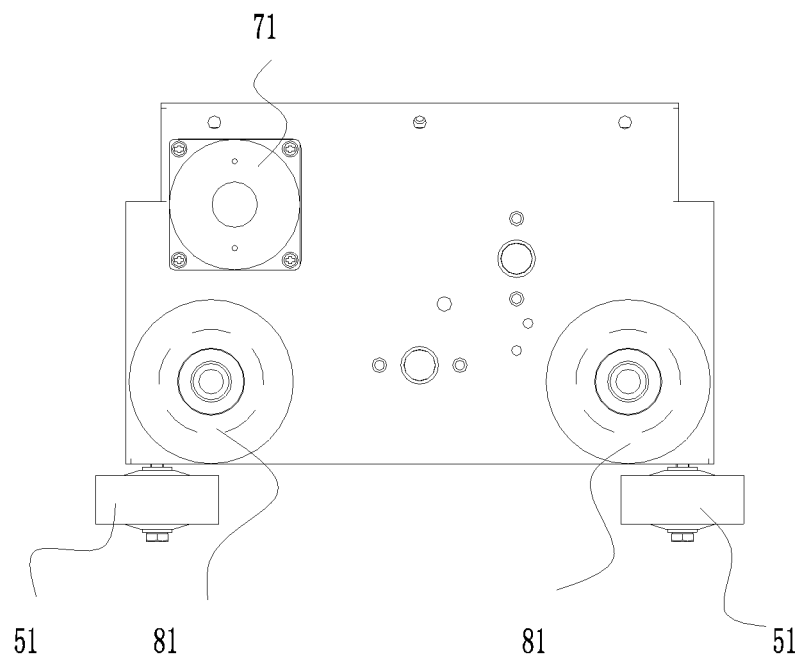
FIG. 5 is a front view showing a first box driving module according to an embodiment of the present application.
Figure 6:
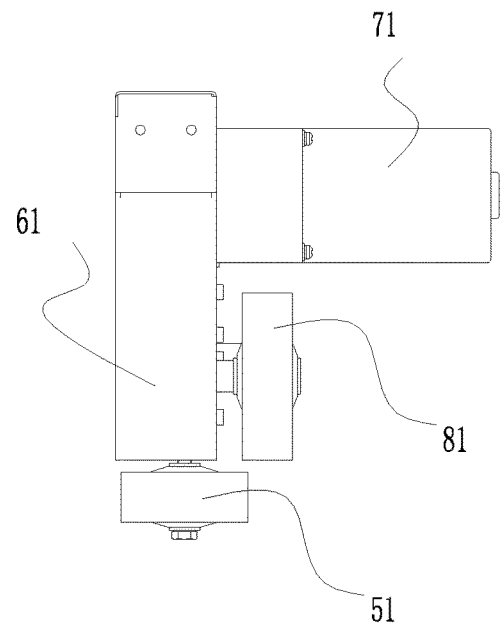
FIG. 6 is right side view showing the first box driving module according to an embodiment of the present application.
Figure 7:
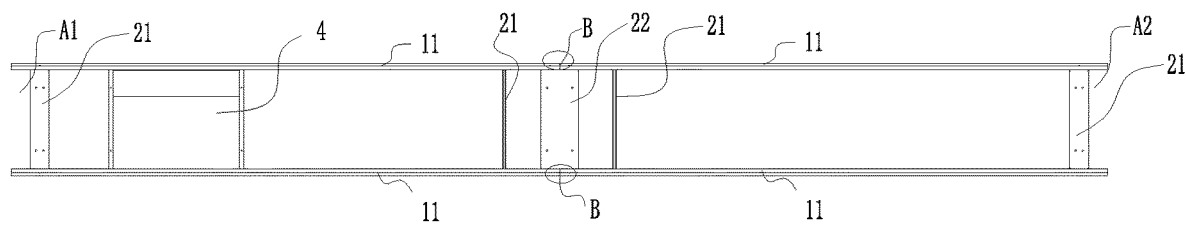
FIG. 7 is a schematic view showing the structure of a rectangular frame according to an embodiment of the present application.
Figure 8:
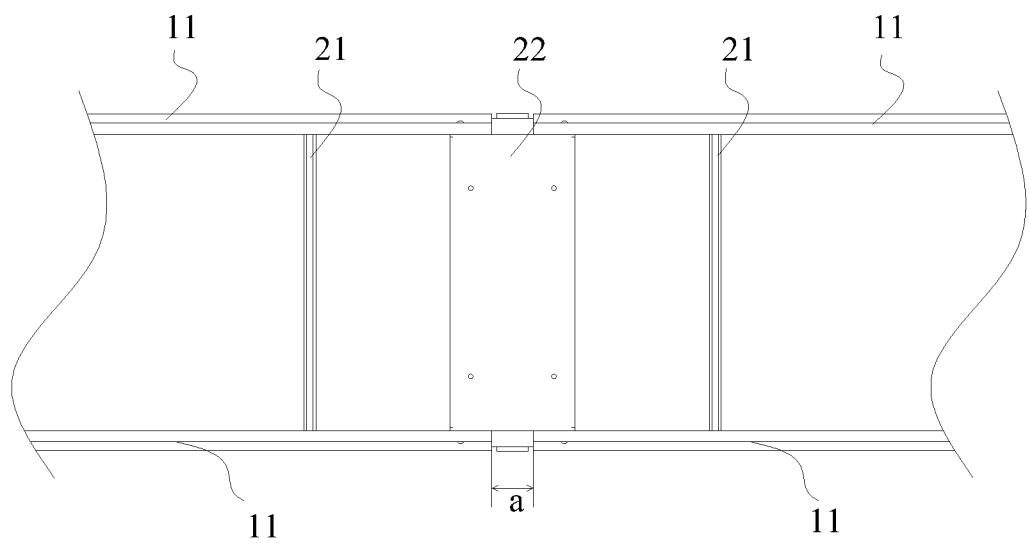
FIG. 8 is partially enlarged view of FIG. 7.
Figure 9:
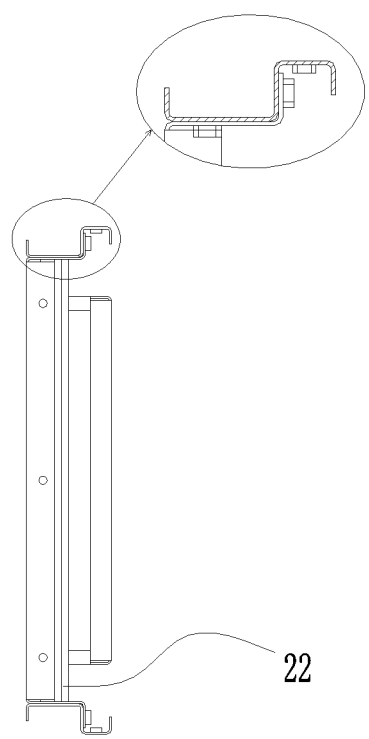
FIG. 9 is a schematic view showing the connection between a splicing longitudinal beam and a transverse beam unit.

Referring to FIGS. 1 to 9, FIG. 1 is a front view showing an internal structure of an intelligent cleaning robot according to an embodiment of the present application; FIG. 2 is a bottom view showing the internal structure of the intelligent cleaning robot according to an embodiment of the present application; FIG. 3 is a top view showing the internal structure of the intelligent cleaning robot according to an embodiment of the present application; FIG. 4 is a schematic view showing the structure of a first transmission system according to an embodiment of the present application; FIG. 5 is a front view showing a first box driving module according to an embodiment of the present application; FIG. 6 is right side view showing the first box driving module according to an embodiment of the present application; FIG. 7 is a schematic view showing the structure of a rectangular frame according to an embodiment of the present application; FIG. 8 is partially enlarged view of FIG. 7; and FIG. 9 is a schematic view showing the connection between a splicing longitudinal beam and a transverse beam unit.

An intelligent cleaning robot is provided in this embodiment of the present application. The intelligent cleaning robot includes a frame, a sweeping device 3, a control system 4, a first walking wheel 81 and a second walking wheel 82.

The sweeping device 3 is installed on the frame, to perform sweeping operations.

The first walking wheel 81 and the second walking wheel 82 are installed at two ends of the frame respectively, and are respectively driven by a first motor 71 and a second motor 72 to move, to propel the intelligent cleaning robot to move on a device to be cleaned.

The control system 4 is in signal communication with both the first motor 71 and the second motor 72, to control the first motor 71 and the second motor 72 to rotate synchronously, or rotate in different rotational speeds or different directions, so as to adjust a walking posture of the intelligent cleaning robot.

According to the above technical solution, in the intelligent cleaning robot provided by the embodiment of the present application, the first walking wheel 81 and the second walking wheel 82 located at two sides are constrained by each other through the frame, which facilitates evenly applying force on the intelligent cleaning robot to allow the cleaning robot to operate smoothly. Further, the control system 4 is driven by two motors (that is, a mode of dual-motor and dual-drive is used), and thus the control mode and adjust mode of the control system 4 for driving and walking is more flexible and controllable. Thus, the first walking wheel 81 and the second walking wheel 82 may implement multiple modes of walking, for example, moving synchronously, moving independently, or moving with a certain speed ratio therebetween. In this way, the walking posture of the intelligent cleaning robot may be adjusted and corrected at will, which can meet detailed requirements of devices to be cleaned having various shapes and structures, and improve the capability of automatically avoiding obstacles and correcting deviations.

It is to be noted that, in a specific embodiment, design of the control system 4 may be implemented in multiple ways, for example, by using an infrared sensor and a corresponding control method. The specific way may be configured according to practical needs by the person skilled in the art, which is not limited herein.

The intelligent cleaning robot provided by the embodiment of the present application may be used to clean dust on the surface of the photovoltaic cell assembly, that is, a device to be cleaned is the photovoltaic cell assembly. However, the present application is not limited thereto, and the person skilled in the art may also use the intelligent cleaning robot to clean other devices to be cleaned according to practical needs, which is not limited herein.

In a specific embodiment, the intelligent cleaning robot further includes a middle walking wheel 9 installed on the frame, and the middle walking wheel 9 is located between the first walking wheel 81 and the second walking wheel 82. Preferably, the first walking wheel 81, the second walking wheel 82 and the middle walking wheel 9 each includes at least a pair of rollers, to make the intelligent cleaning robot operate smoothly.

In a specific embodiment, the intelligent cleaning robot further includes a first limit wheel 51 and a second limit wheel 52 respectively located at two ends of the frame and configured to prevent scratching of sides of the intelligent cleaning robot, or to prevent the intelligent cleaning robot from deviating from the original walking course.

In a specific embodiment, the intelligent cleaning robot further includes a protective shell covering the frame and the sweeping device 3, to achieve effects of attractive appearance, protection and dustproof. Preferably, the protective shell and the frame may be installed detachably and separated quickly.

In a specific embodiment, the sweeping device 3 includes a first sweeping device and a second sweeping device which are coaxially arranged.

The first sweeping device and the second sweeping device may be connected together, and may also be arranged separately and independently. When being connected together, the first sweeping device and the second sweeping device are driven by a same driving device or driving devices operating simultaneously.

In a preferable solution, the first sweeping device and the second sweeping device are arranged separately and independently, and are driven by different driving devices. For example, an outer end of the first sweeping device is drivably connected to a third motor, and an inner end of the first sweeping device is rotationally connected to the frame. An outer end of the second sweeping device is drivably connected to a fourth motor, and an inner end of the second sweeping device is rotationally connected to the frame.

Herein, the inner end refers to an end close to the middle of the frame, and the outer end refers to the end close to the ends of the frame.

More preferably, the first sweeping device and the first walking wheel 81 are driven synchronously, that is, the third motor and the first motor 71 is the same motor. The second sweeping device and the second walking wheel 82 are driven synchronously, that is, the fourth motor and the second motor 72 are the same motor.

Specifically, as shown in FIGS. 4 and 5, a transmission end of the first motor 71 is provided with a motor chain wheel 70, the outer end of the first sweeping device is provided with a sweeping chain wheel 30, and two rollers of the first walking wheel 81 are each connected coaxially with a respective walking chain wheel 80. The motor chain wheel 70 is drivably connected to the sweeping chain wheel 30 through a first transmission chain. The sweeping chain wheel 30 is drivably connected to the two walking chain wheels 80 through a second transmission chain. The motor chain wheel 70, the sweeping chain wheel 30, the walking chain wheels 80, the first transmission chain, the second transmission chain and a free chain wheel constitute a first transmission system.

Similarly, a motor chain wheel is provided at a transmission end of the second motor 72, a sweeping chain wheel is provided at the outer end of the second sweeping device, two rollers of the second walking wheel 82 are each connected to a respective walking chain wheel, and the motor chain wheel, the sweeping chain wheel, the two walking chain wheels, corresponding transmission chains and a free chain wheel constitute a second transmission system.

In operation, the first motor 71 propels the first walking wheel 81 and the first sweeping device to rotate synchronously through the first transmission system. The second motor 72 propels the second walking wheel 82 and the second sweeping device to rotate synchronously through the second transmission system. Thus, a purpose for allowing the intelligent cleaning robot to perform cleaning operations while walking is accomplished.

The present application is not limited to this. In other embodiments, the third motor and the first motor 71 may be different motors, and the fourth motor and the second motor 72 may be different motors. In this way, the sweeping device has an extended length, to adapt to different numbers of photovoltaic cell assemblies.

To further optimize the above technical solution, in the intelligent cleaning robot provided by the embodiment of the present application, the frame includes a main frame, and a first box 61 and a second box 62 located at two ends of the main frame.

The first walking wheel 81, the first motor 71 and a first limit wheel 51 are all installed on a mounting panel of the first box 61, and the first transmission system formed among the first walking wheel 81, the first motor 71 and the sweeping device 3 are enclosed in the first box 61, thereby constituting a first box drive module (see FIGS. 4-6).

The second walking wheel 82 and the second motor 72 are installed on a mounting panel of the second box 62, and the second transmission system formed among the second walking wheel 82, the second motor 72 and the sweeping device 3 are enclosed in the second box 62, thereby constituting a second box drive module.

The control system 4 is installed on the main frame.

In each of the first box drive module and the second box drive module, the limit wheel, the walking wheel, the motor and the transmission system are integrated, thereby realizing a compact structure and a high level of integration. The size and weight of the intelligent cleaning robot is reduced effectively, thereby increasing energy conversion efficiency and output power, enhancing cleaning effect, and improving the capability of avoiding obstacles and the reliability of operation.

Furthermore, the first box drive module and the second box drive module have similar layouts and symmetrical structures, therefore, types of components may be reduced, and installation and maintenance are convenient. Further, the intelligent cleaning robot is subjected to even forces, thus can operate smoothly, and it facilitates the modularization assemble of the intelligent cleaning robot.

Specifically, motor flanges and bearings of reducers are also enclosed in the first box 61 and the second box 62. By sealing the first box 61 and the second box 62, protective performance of all components in the boxes may be improved effectively, protective level of the components in the boxes is increased, and the reliability, environmental adaptability and working life of the cleaning robot are enhanced.

In a specific embodiment, the main frame is a rectangular frame structure. The rectangular frame structure includes a first transverse beam, a second transverse beam and a longitudinal beam having two ends respectively connected to the first transverse beam and the second transverse beam.

Specifically, the control system 4 is an independent module structure internally located between the first transverse beam and the second transverse beam. The first box drive module and the second box drive module are respectively installed at two ends of the first transverse beam and the second transverse beam. The sweeping device 3 is in parallel with the first transverse beam and the second transverse beam, and is located between the first transverse beam and the second transverse beam.

The intelligent cleaning robot provided by the embodiment of the present application includes a main frame module (that is, the main frame), a sweeping module (that is, the sweeping device 3), a control module (that is, the control system 4), a first box drive module and a second box drive module, thereby realizing modularization assembling, and facilitating installation and maintenance.

In a specific embodiment, each of the first sweeping device and the second sweeping device is preferably embodied as a brush, and a central axis of the brush is in parallel with the first transverse beam and the second transverse beam. Any kinds of sweeping devices having the function of cleaning can be adopted by the person skilled in the art according to practical needs, which are not limited herein.

To further optimize the above technical solution, in the intelligent cleaning robot provided by the embodiment of the present application, a cross section of the first transverse beam and a cross section of the second transverse beam are both in an S shape. The S-shaped cross section of the first transverse beam and the S-shaped cross section of the second transverse beam are arranged symmetrically during installation. The longitudinal beam has an end connected to the first transverse beam and an end connected to the second transverse beam, and the two ends are both an L-shaped folded-plate connecting structure matching the shape of a bent portion of the S-shaped cross section (see the partially enlarged view in FIG. 9).

Specifically, the first transverse beam and the second transverse beam are both made of aluminum profile structural member. The first transverse beam, the second transverse beam and the longitudinal beams are connected by splicing.

Preferably, each of the first transverse beam and the second transverse beam includes at least two transverse beam units 11 connected end to end; the longitudinal beam includes multiple supporting longitudinal beams 21 and splicing longitudinal beams 22. The two transverse beam units 11 connected end to end are connected through an end of the splicing longitudinal beam 22. Longitudinal beams connected at other positions between the first transverse beam and the second transverse beam are collectively called as the supporting longitudinal beams 21, for example, corresponding ends of the first transverse beam and the second transverse beam are connected through the supporting longitudinal beam 21.

An adjusting clearance a is arranged between the two transverse beam units 11 connected end to end, and a is greater than 0. Alternatively, the at least two transverse beam units 11 connected end to end may be directly connected without an adjusting clearance therebetween.

A connecting structure is arranged at a lower side surface of the splicing longitudinal beam 22, and is used for connection with the middle walking wheels 9 and inner ends of the sweeping device 3.

The first transverse beam and the second transverse beam each have an S-shaped cross section, which forms strip-shaped grooves. Thus, the first transverse beam and the second transverse beam has small size and light weight, and can bear heavy loads, which increases energy conversion efficiency and output power of the intelligent cleaning robot, improves cleaning effect and the capability of avoiding obstacles of the intelligent cleaning robot, and facilitates cable routing and component installation. Since the cross section of the first transverse beam and the cross section of the second transverse beam are in an S shape, the first transverse beam and the second transverse beam each have multiple surfaces, and every surface may be used to install a component.

The first transverse beam and the second transverse beam have the S-shaped cross sections, and are each formed by splicing multiple transverse beam units together, and thus the transverse beams can be assembled more flexible, which allows modularized lengthening of the device in sections. Therefore, by adjusting the number of the transverse beam units 11, or lengthening or shortening the transverse beam units 11, or changing the dimension of the adjusting clearance a, the length of the transverse beam can be adjusted, and the purpose of adapting the intelligent cleaning robot to photovoltaic cell assemblies having different sweeping lengths is achieved. Further, flexibility of the device is increased, security and reliability in operation are improved, and the working life of the device is increased effectively.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

The above embodiments in the specification are described in a progressive manner. Each of the embodiments is mainly focused on describing its differences from other embodiments, and references may be made among these embodiments with respect to the same or similar portions among these embodiments.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. An intelligent cleaning robot, comprising:
   a frame;
   a sweeping device installed on the frame to perform a sweeping operation;
   a first walking wheel located at one end of the frame and configured to be driven by a first motor to move;
   a second walking wheel located at another end of the frame and configured to be driven by a second motor to move; and
   a control system in signal communication with both the first motor and the second motor, and configured to control the first motor and the second motor to rotate synchronously, or control the first motor and the second motor to rotate at different rotational speeds or different directions, to adjust a walking posture of the intelligent cleaning robot;
   wherein the sweeping device comprises a first sweeping device and a second sweeping device which are coaxially arranged;
   an outer end of the first sweeping device is drivably connected to a third motor, and an inner end of the first sweeping device is rotationally connected to the frame; and
   an outer end of the second sweeping device is drivably connected to a fourth motor, and an inner end of the second sweeping device is rotationally connected to the frame.

2. The intelligent cleaning robot according to claim 1, further comprising:
   a middle walking wheel installed on the frame between the first walking wheel and the second walking wheel; and/or
   a first limit wheel and a second limit wheel provided at two ends of the frame respectively, and configured to prevent scratching of sides of the intelligent cleaning robot, or prevent the intelligent cleaning robot from deviating from its original walking course; and/or
   a protective shell covering the frame and the sweeping device.

3. The intelligent cleaning robot according to claim 1, wherein the first walking wheel comprises at least a pair of rollers, and/or, the second walking wheel comprises at least a pair of rollers.

4. The intelligent cleaning robot according to claim 2, wherein the frame comprises a main frame, and a first box and a second box located at two ends of the main frame; and
   wherein, the first walking wheel and the first motor are installed on a mounting panel of the first box, and a first transmission system formed among the first walking wheel, the first motor and the first sweeping device is enclosed in the first box; and the second walking wheel and the second motor are installed on a mounting panel of the second box, and a second transmission system formed among the second walking wheel, the second motor and the second sweeping device is enclosed in the second box; and/or
   the control system is installed on the main frame.

5. The intelligent cleaning robot according to claim 4, wherein the main frame is a rectangular frame structure, and the rectangular frame structure comprises:
   a first transverse beam and a second transverse beam located at two sides of the first and second sweeping devices, respectively; and
   a longitudinal beam having two ends connected to the first transverse beam and the second transverse beam respectively.

6. The intelligent cleaning robot according to claim 5, wherein the first transverse beam has an S-shaped cross section, and/or, the second transverse beam has an S-shaped cross section.

7. The intelligent cleaning robot according to claim 5, wherein the first transverse beam comprises at least two transverse beam units connected end to end, and the second transverse beam includes at least two transverse beam units connected end to end; and
   wherein the longitudinal beam comprises a supporting longitudinal beam and a splicing longitudinal beam, the two transverse beam units connected end to end are connected through an end of the splicing longitudinal beam.

8. The intelligent cleaning robot according to claim 6, wherein the two ends of the longitudinal beam comprises a first end connected to the first transverse beam and a second end connected to the second transverse beam, and the first and second ends are each an L-shaped folded-plate connecting structure matching the shape of a bent portion of the S-shaped cross section.

9. The intelligent cleaning robot according to claim 1, wherein the first motor and the third motor are the same motor, and/or, the second motor and the fourth motor are the same motor.

10. The intelligent cleaning robot according to claim 1, wherein the frame comprises a main frame, and a first box and a second box located at two ends of the main frame; and
    wherein, the first walking wheel and the first motor are installed on a mounting panel of the first box, and a first transmission system formed among the first walking wheel, the first motor and the first sweeping device is enclosed in the first box; and the second walking wheel and the second motor are installed on a mounting panel of the second box, and a second transmission system formed among the second walking wheel, the second motor and the second sweeping device is enclosed in the second box; and/or
    the control system is installed on the main frame.

11. The intelligent cleaning robot according to claim 10, wherein the main frame is a rectangular frame structure, and the rectangular frame structure comprises:
    a first transverse beam and a second transverse beam located at two sides of the first and second sweeping devices, respectively; and
    a longitudinal beam having two ends connected to the first transverse beam and the second transverse beam respectively.

12. The intelligent cleaning robot according to claim 11, wherein the first transverse beam has an S-shaped cross section, and/or, the second transverse beam has an S-shaped cross section.

13. The intelligent cleaning robot according to claim 12, wherein the two ends of the longitudinal beam comprises a first end connected to the first transverse beam and a second end connected to the second transverse beam, and the first and second ends are each an L-shaped folded-plate connecting structure matching the shape of a bent portion of the S-shaped cross section.

14. The intelligent cleaning robot according to claim 11, wherein the first transverse beam comprises at least two transverse beam units connected end to end, and the second transverse beam includes at least two transverse beam units connected end to end; and wherein the longitudinal beam comprises a supporting longitudinal beam and a splicing longitudinal beam, and the two transverse beam units connected end to end are connected through an end of the splicing longitudinal beam.

15. The intelligent cleaning robot according to claim 14, wherein an adjusting clearance is provided between the two transverse beam units connected end to end and the adjusting clearance is greater than 0.

16. The intelligent cleaning robot according to claim 1, wherein the frame comprises a main frame, and a first box and a second box located at two ends of the main frame; and wherein, the first walking wheel and the first motor are installed on a mounting panel of the first box, and a first transmission system formed among the first walking wheel, the first motor and the first sweeping device is enclosed in the first box; and the second walking wheel and the second motor are installed on a mounting panel of the second box, and a second transmission system formed among the second walking wheel, the second motor and the second sweeping device is enclosed in the second box; and/or the control system is installed on the main frame.

17. The intelligent cleaning robot according to claim 16, wherein the main frame is a rectangular frame structure, and the rectangular frame structure comprises:

a first transverse beam and a second transverse beam located at two sides of the first and second sweeping devices, respectively; and a longitudinal beam having two ends connected to the first transverse beam and the second transverse beam respectively.

18. The intelligent cleaning robot according to claim 17, wherein the first transverse beam has an S-shaped cross section, and/or, the second transverse beam has an S-shaped cross section.

19. The intelligent cleaning robot according to claim 18, wherein the two ends of the longitudinal beam comprises a first end connected to the first transverse beam and a second end connected to the second transverse beam, and the first and second ends are each an L-shaped folded-plate connecting structure matching the shape of a bent portion of the S-shaped cross section.

* * * * *